United States Patent
Hanson et al.

(10) Patent No.: US 12,157,433 B2
(45) Date of Patent: Dec. 3, 2024

(54) SECONDARY AUTHENTICATION

(71) Applicant: FORD GLOBAL TECHNOLOGIES, LLC, Dearborn, MI (US)

(72) Inventors: Ryan Edwin Hanson, Livonia, MI (US); John Robert Van Wiemeersch, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 7 days.

(21) Appl. No.: 18/050,647

(22) Filed: Oct. 28, 2022

(65) Prior Publication Data
US 2024/0140360 A1    May 2, 2024

(51) Int. Cl.
*B60R 25/24*    (2013.01)
*B60R 25/01*    (2013.01)
*B60R 25/30*    (2013.01)
*B60R 25/31*    (2013.01)

(52) U.S. Cl.
CPC ............ *B60R 25/241* (2013.01); *B60R 25/01* (2013.01); *B60R 25/305* (2013.01); *B60R 25/31* (2013.01); *B60R 2325/103* (2013.01); *B60R 2325/20* (2013.01)

(58) Field of Classification Search
CPC ..... B60R 25/241; B60R 25/01; B60R 25/305; B60R 25/31; B60R 2325/103; B60R 2325/10
See application file for complete search history.

(56) References Cited

U.S. PATENT DOCUMENTS

| | | | |
|---|---|---|---|
| 8,629,755 B2 * | 1/2014 | Hashim-Waris ... | G06Q 30/0601 705/13 |
| 9,537,661 B2 | 1/2017 | Khalil et al. | |
| 10,223,852 B2 * | 3/2019 | Hernandez ......... | G07C 9/00309 |
| 10,305,895 B2 * | 5/2019 | Barry ..................... | G07C 9/257 |
| 11,288,352 B1 | 3/2022 | Johnson et al. | |
| 2006/0082437 A1 * | 4/2006 | Yuhara .................. | B60R 25/255 340/5.82 |
| 2006/0197380 A1 * | 9/2006 | DiCroce ............. | B60R 25/2009 307/9.1 |

(Continued)

OTHER PUBLICATIONS

RFID Enables Driver Authentication and Vehicle Access Control in Fleet Management, Elatec Inc., Jan. 25, 2022. Retrieved from https://linkedin.com/pulse/rfid-enables-driver-authentication-vehicle-access-control-/ on Aug. 24, 2022.

*Primary Examiner* — Thomas D Alunkal
(74) *Attorney, Agent, or Firm* — Frank Lollo; Brooks Kushman P.C.

(57) ABSTRACT

An enhanced validation mode for a vehicle is provided. Presence of a primary access device is identified, using a radio frequency (RF) transceiver of the vehicle. Responsive to the vehicle being in the enhanced validation mode, aspects of a secondary access device are validated with an access list descriptive of which secondary access devices are allowable for use in confirming a user is authorized, in addition to utilizing the primary access device to validate access to the vehicle, the secondary access device being a physical credential issued to a user to grant the user access to a physical location. Responsive to the vehicle not being in the enhanced validation mode, the primary access device but not the secondary access device are utilized to validate access to the vehicle.

18 Claims, 7 Drawing Sheets

(56) References Cited

U.S. PATENT DOCUMENTS

| | | | |
|---|---|---|---|
| 2010/0060452 A1* | 3/2010 | Schuster | G06Q 10/08 340/572.1 |
| 2012/0306636 A1* | 12/2012 | Tieman | B60R 25/20 340/426.24 |
| 2013/0066667 A1* | 3/2013 | Gulec | G06Q 10/06 705/7.13 |

* cited by examiner

SECONDARY AUTHENTICATION

TECHNICAL FIELD

Aspects of the disclosure generally relate to a secondary authentication for vehicle access.

BACKGROUND

Vehicle key fobs may be used to allow a user to gain access to a vehicle, as well as to drive away in the vehicle. Some fob devices operate such that when a button is pressed on the fob, the device sends a code to the vehicle to instruct the vehicle to unlock the vehicle. Passive entry passive start (PEPS) key fobs operate to provide response to a challenge pulse train sent by the vehicle, where if a proper response is received by the vehicle, then the door may be unlocked by a user grasping the door handle or depressing the door handle switch.

Phone-as-a-Key (PaaK) systems are being introduced to allow users to utilize their phones to unlock a vehicle without requiring a key fob device. These systems may operate similar to a key fob, but where the phone communicates with the vehicle over BLUETOOTH LOW ENERGY (BLE), Ultra-Wideband (UWB), near field communication (NFC), or other mobile device wireless technologies.

SUMMARY

In one or more illustrative examples, a vehicle implementing an enhanced validation mode is provided. The vehicle includes a controller having a hardware processor. The controller is programmed to identify presence of a primary access device. Responsive to the vehicle being in the enhanced validation mode, the controller is programmed to validate aspects of a secondary access device with an access list descriptive of which secondary access devices are allowable for use in confirming a user is authorized, in addition to utilizing the primary access device to validate access to the vehicle, the secondary access device being a physical credential issued to the user to grant the user access to a physical location. Responsive to the vehicle not being in the enhanced validation mode, the controller is programmed to utilize the primary access device but not the secondary access device to validate access to the vehicle.

In one or more illustrative examples, a method for implementing an enhanced validation mode is provided. The method includes identifying, using a radio frequency (RF) transceiver of the vehicle, presence of a primary access device. The method also includes, responsive to the vehicle being in the enhanced validation mode, validating aspects of a secondary access device with an access list descriptive of which secondary access devices are allowable for use in confirming a user is authorized, in addition to utilizing the primary access device to validate access to the vehicle, the secondary access device being a physical credential issued to the user to grant the user access to a physical location. The method also includes, responsive to the vehicle not being in the enhanced validation mode, utilizing the primary access device but not the secondary access device to validate access to the vehicle.

In one or more illustrative examples, a non-transitory computer readable medium includes instructions for implementing an enhanced validation mode that, when executed by a hardware processor of a controller of a vehicle, causes the vehicle to perform operations including to identify, using a RF transceiver of the vehicle, presence of a primary access device; responsive to the vehicle being in the enhanced validation mode, validate aspects of a secondary access device with an access list descriptive of which secondary access devices are allowable for use in confirming a user is authorized, in addition to utilizing the primary access device to validate access to the vehicle, the secondary access device being an employee badge issued to the user to grant the user access to a physical location of an employer at which the vehicle is present; and responsive to the vehicle not being in the enhanced validation mode, utilize the primary access device but not the secondary access device to validate access to the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Dealerships, fleets yards, transport companies, and manufacturer storage lots may maintain a volume and variety of vehicles. These facilities often store the vehicles with or near their keys for convenience. Such facilities may provide access to coveted, rare, or high-valued vehicles or vehicle content at same location. Because the facilities store many vehicles, they may thus provide a target for thieves. As such, popular and/or highly valued vehicles, parts, or contents may suffer from unauthorized use or theft from such lots. In some cases, camera systems or barriers may be used to reduce the likelihood of a vehicle being access by unauthorized personnel.

Aspects of the disclosure relate to use of additional authentication elements and/or vehicle connectivity to add a second level of security to vehicle access. For instance, information from a user's employee badge may be used as a secondary authentication, in addition to a fob, code, or key. In another example, vehicle connectivity may be used to maintain a whitelist of authorized users, which may be validated using employee badges or other information. In an example, a vehicle may be authorized to be started responsive to presence of both the vehicle key and also the employee's badge.

Such features may be available in an enhanced validation mode. In an example, the enhanced validation mode may be used before the vehicle is delivered to the customer and disabled once the vehicle is in a delivered to customer mode. In another example, the enhanced validation may be used when the vehicle is in custody of a dealer or repair facility, to ensure that the vehicle is being accessed by authorized dealer or repair personnel. In yet another example, the enhanced validation may be used when the vehicle is in a valet mode, to ensure that the vehicle is being accessed by authorized valet personnel.

Figure 1:
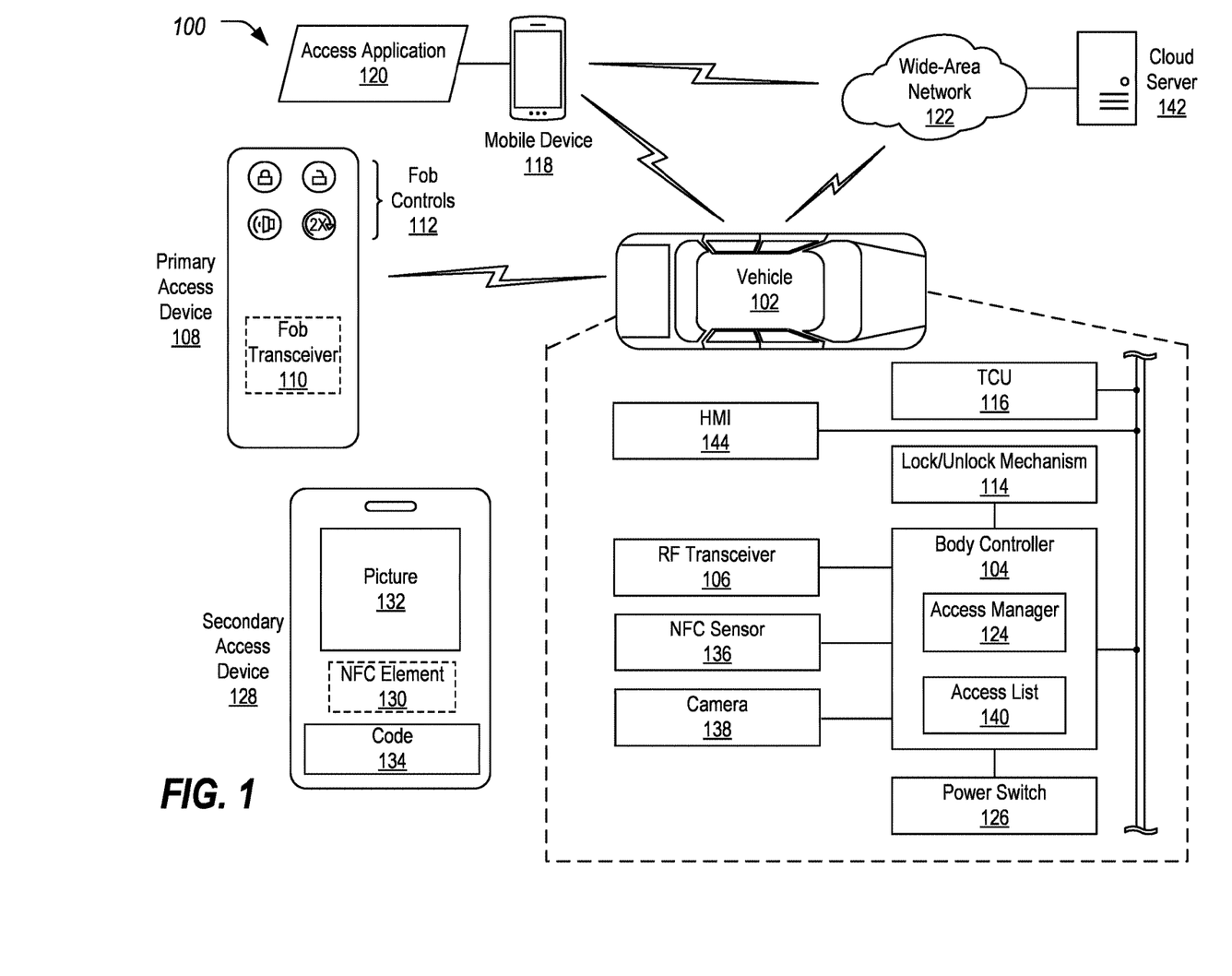
FIG. 1 illustrates an example system implementing an enhanced validation mode providing secondary authentication for vehicle access.

FIG. 1 illustrates an example system 100 implementing an enhanced validation mode providing secondary authentication for vehicle 102 access. The vehicle 102 may include a body controller 104 configured to receive inputs from various components to perform access functions. These components may include a RF transceiver 106, NFC transceivers 136, and/or cameras 138. The body controller 104 may be configured to utilize an access manager 124 to provide access to the vehicle 102 based on the presence of primary access devices 108, such as physical keys and/or mobile devices 118 executing access applications 120. In the enhanced validation mode, the body controller 104 may provide a second layer of access control by using the NFC transceivers 136 and/or cameras 138 to detect aspects of secondary access device 128.

The vehicle 102 may include various types of automobile, crossover utility vehicle (CUV), sport utility vehicle (SUV), truck, recreational vehicle (RV), boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a plug-in hybrid electrical vehicle (PHEV). Alternatively, the vehicle 102 may be an autonomous vehicle (AV). The level of automation may vary between variant levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs).

The body controller 104 may be a component of the vehicle 102 configured to control features such as exterior lighting, power windows, power mirrors, air conditioning, immobilizers, latches, and locks. The body controller 104 may be in communication with various components of the vehicle 102 in support of performance of these functions. For instance, the body controller 104 may be in communication with an RF transceiver 106 to allow the body controller 104 to authenticate a user via communication with a corresponding fob transceiver 110 of the primary access device 108. The primary access device 108 may include one or more controls 112, such as a lock button, an unlock button, a remote start button, and/or an alarm button.

A lock/unlock mechanism 114 may be operably coupled to the body controller 104. The body controller 104 may be configured to control the lock/unlock mechanism 114 to unlock/lock doors of the vehicle 102 in response to the RF signals transmitted by the primary access device 108. For instance, the body controller 104 may control the lock/unlock mechanism 114 to lock the doors of the vehicle 102 in response to a user depressing a lock button access control 112 of the primary access device 108, and to unlock the doors of the vehicle 102 in response to the user depressing an unlock button access control 112 of the primary access device 108.

In another example, the body controller 104 may utilize a telematics control unit (TCU) 116 of the vehicle 102 to be in communication with a mobile device 118 to which an access application 120 is installed. The access application 120 may allow the user to utilize the mobile device 118 as a primary access device 108 to provide entry to the vehicle 102. For instance, the access application 120 may be configured to display fob controls 112, such as a lock button, an unlock button, a remote start button, and/or an alarm button, on a screen of the mobile device 118. When pressed, similar to use of the fob transceiver 110 of the primary access device 108, the mobile device 118 may communicate with the body controller 104 to request access to the vehicle 102 (or in other implementations via the TCU 116 which in turn communicates with the body controller 104).

The TCU 116 may include network hardware configured to facilitate communication between the vehicle 102 and other devices of the system 100 such as the mobile device 118. For example, the TCU 116 may include or otherwise access a cellular modem configured to facilitate communication with a wide-area network 122. The wide-area network 122 may include one or more interconnected communication networks such as the Internet, a cable television distribution network, a satellite link network, a local area network, and a telephone network, as some non-limiting examples. As another example, the TCU 116 may utilize one or more of BLUETOOTH, UWB, Wi-Fi, or wired universal serial bus (USB) network connectivity to facilitate local communication with the user's mobile device 118 without connection to the wide-area network 122.

The body controller 104 may include an access manager 124. The access manager 124 may be configured to authenticate authentication requests to enter and/or start the vehicle 102. For example, with a passive anti-theft system (PATS) implementation, the key is inserted into an ignition switch to start the vehicle 102. In such a case, the RF transmitter of the key transmits RF signals having encrypted data therein to the receiver of the access manager 124. The access manager 124 decrypts the data to authenticate the key prior to allowing the user to start the vehicle 102. With a PEPS implementation, a key is not needed to be turned in a key cylinder to start the vehicle 102. In such a case, the access manager 124 may authenticate a tracked device, such as via RF encrypted data passively transmitted by the fob transceiver 110 to allow the user access (or transmitted data from a PaaK, or other passive validations such as verification of facial features). With a PaaK implementation, the access manager 124 may authenticate data transmitted from the access application 120 of the mobile device 118 to allow the user access. For instance, if the PaaK of the user is validated, a power switch 126 of the vehicle 102 may be enabled to allow the user to transition the vehicle 102 into a motive mode.

In some instances, it may be desirable to utilize additional authentication elements of a secondary access device 128 and/or connectivity to add a second level of security for access to the vehicle 102. For instance, these additional authentication elements may be utilized when the vehicle 102 is in the enhanced validation mode.

The secondary access device 128 is a physical credential issued to an authorized user. In an example, the secondary access device 128 may be an employee badge designed to provide access to areas restricted to employees. It should be noted that other form factors and types of the secondary access device 128 are possible, such as a wristbands, vests, credit cards, membership cards, pins, or other wearable items.

The secondary access device 128 may be configured to allow the user access to buildings, parking lots, and employer facilities where vehicles 102 may be stored. In an example, this may include confirming that the user is an employee of the physical location at which the vehicles 102 are stored. To do so, the secondary access device 128 may include various functionality. In an example, the secondary access device 128 may include an embedded NFC element 130 configured to provide coded information to an NFC reader. This coded information may be recognized and verified by the NFC reader to allow access. In another example the secondary access device 128 may include a picture 132 of a face or other portion of the authorized user. This picture 132 may be scanned or viewed and may be compared to the face or other portion of the user to confirm access. In yet another example, the secondary access device 128 may include a code 134 printed or otherwise visible on the secondary access device 128. This code 134 may be a barcode, quick response (QR) code, etc. The code 134 may be read by a camera 138 or barcode reader to confirm the identity of the user.

The body controller 104 may be configured to be in communication with additional components to utilize the features of the secondary access device 128 to confirm access to the vehicle 102. In an example, the access application 120 of the body controller 104 may be configured to utilize one or more NFC transceivers 136 of the vehicle 102 to read data from the NFC element 130. In another example, the access application 120 of the body controller 104 may utilize one or more cameras 138 of the vehicle 102 to read the picture 132 and/or code 134 from the secondary access device 128. This additional information from the NFC transceivers 136 and cameras 138 may be used by the access application 120 of the body controller 104 to further confirm the identity of a user attempting to access the vehicle 102.

The access application 120 of the body controller 104 may also be configured to receive one or more access lists 140 from a server 142. For instance, the body controller 104 may utilize the TCU 116 to communicate with a cloud server 142 over the wide-area network 122. In other instances, the list may be stored on a local server 142 which may be in the TCU 116. The access lists 140 may be descriptive of which secondary access devices 128 are allowable (as a whitelist) or not allowable (as a blacklist) for use in confirming a user is authorized. The access lists 140 may include, as some examples, indications of codes 134, pictures 132, and other information configured to indicate which users are allowed (or forbidden) access to the vehicle 102. In addition to allowing or denying access, the access list 140 may further indicate details of the access, such as geo-fenced locations in which the vehicle 102 may be used or not used, navigation routes approved for operation of the vehicle 102 by the user, times of operation during which the vehicle 102 may be used or not used, durations of operation for which the vehicle 102 may be used, etc.

The vehicle 102 may also include a human machine interface (HMI) 144 to allow the vehicle 102 to present information to a user and to receive information from the user. The HMI 144 may include, in an example, a center stack touch panel display screen.

Figure 2:
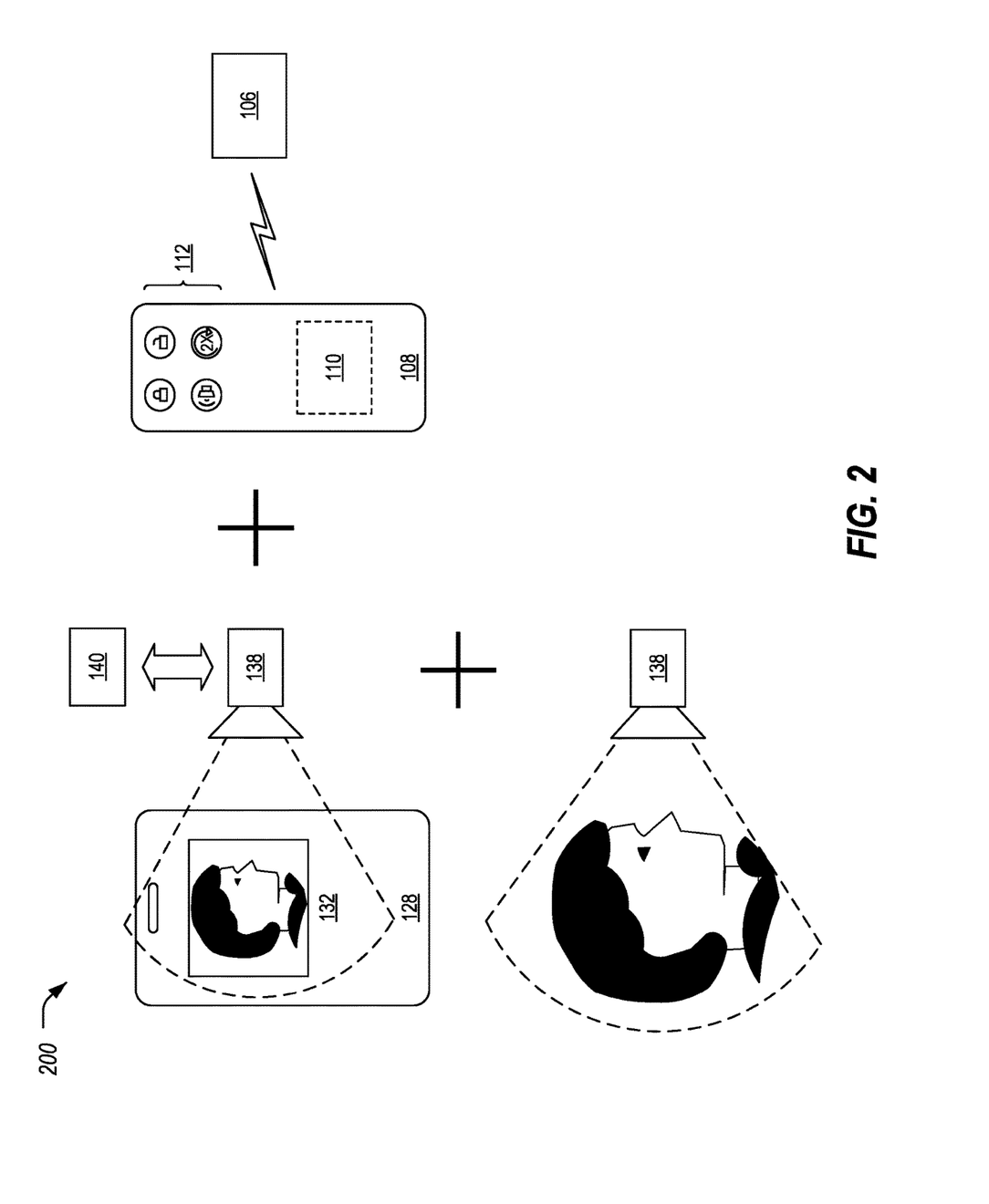
FIG. 2 illustrates an example scenario for utilizing the secondary access device to enhance vehicle authentication.

FIG. 2 illustrates an example scenario 200 for utilizing the secondary access device 128 to enhance vehicle 102 authentication. In the example scenario 200, the secondary access device 128 is used in combination with a key fob as the primary access device 108. It should be noted that this is only an example, and other primary devices may be used instead of the primary access device 108 to provide access to the vehicle 102 (e.g., the mobile device 118 executing the access application 120, an NFC card, entry of an access code, etc.).

In combination with the primary access device 108, the user may present the secondary access device 128 to the camera 138 of the vehicle 102 to allow the camera 138 to capture the picture 132 on the secondary access device 128. For instance, the user may present the secondary access device 128 to the camera 138 at the same time as or prior to the vehicle 102 request for access. In one example, the request for access may be a request for the vehicle 102 to unlock its doors. In another example, the request for access may be a request to transition the vehicle 102 from a parked mode into the motive mode (e.g., by pressing the power switch 126).

Optionally, a tertiary aspect may be used in addition to the secondary access device 128 to confirm the identity of the user. In an example, the camera 138 of the vehicle 102 may additionally be used to capture an image of the user. This image of the user may be compared to the picture 132 from the secondary access device 128. If the images are a match, then the user may be allowed to access the vehicle 102.

In one example, facial recognition techniques may be used to compare the images. This approach may be used to limit authorization only to employees currently having badges, as well as to prevent badges from being shared between users.

In another example, information from the camera 138 may be used to provide a log of the operation of the vehicle 102. For instance, the camera 138 may be used to record the vehicle 102 start event, the authorizing employee secondary access device 128, and/or the operator/operator's face at the time of the start event.

Responsive to the user being identified as an authorized user according to the access list 140, the user may be given access to the vehicle 102 in accordance with the permissions given to the user via the access list 140. For instance, this may allow the user to access the vehicle 102 for specified geo-fenced locations in which the vehicle 102 may be used or not used, navigation routes approved for operation of the vehicle 102 by the user, times of operation during which the vehicle 102 may be used or not used, durations of operation for which the vehicle 102 may be used, etc. If the user is not identified as being an authorized user, the user may be unable to access the vehicle 102, despite the user having possession of the primary access device 108.

Figure 3:
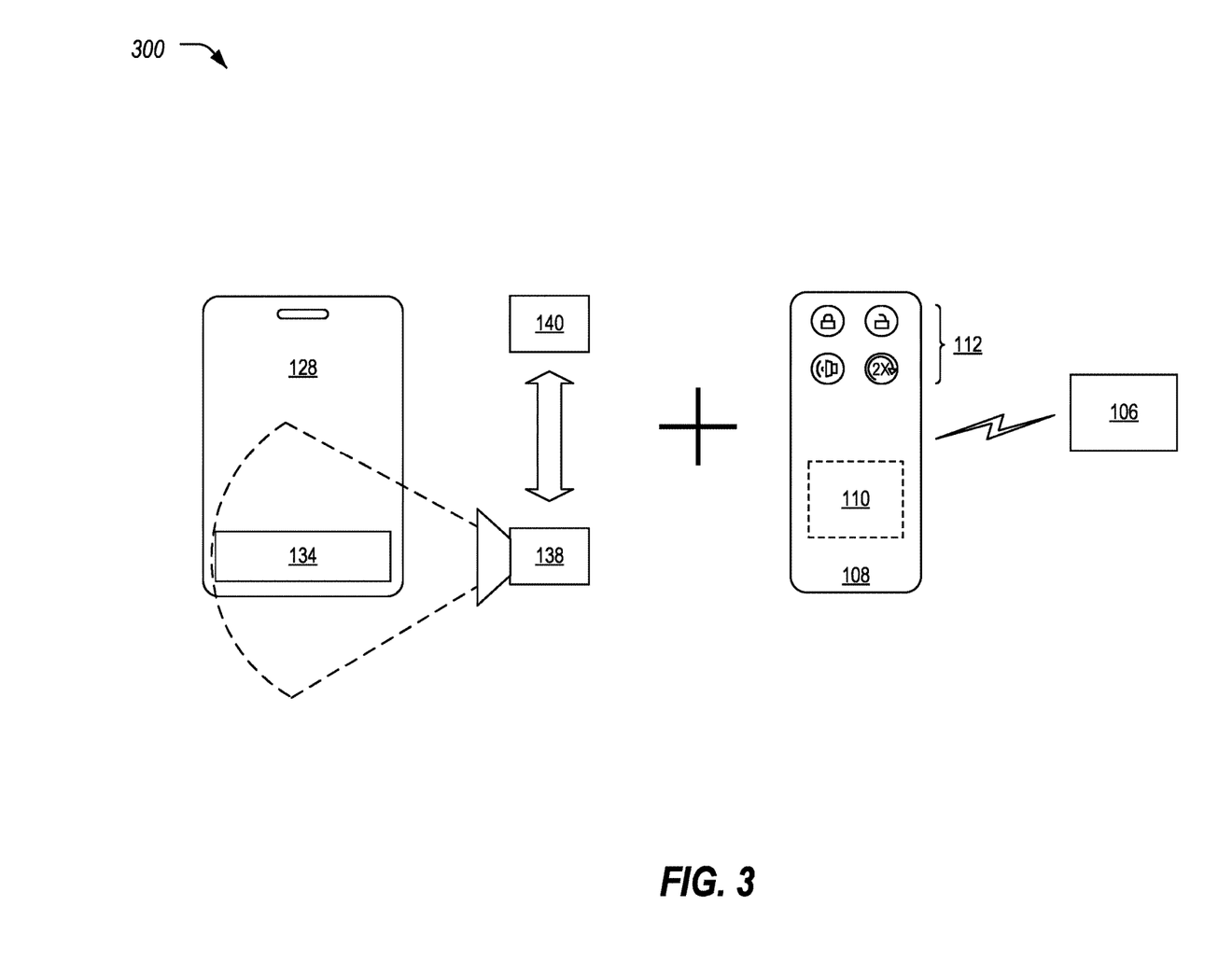
FIG. 3 illustrates another example scenario for utilizing the secondary access device to enhance vehicle authentication.

FIG. 3 illustrates another example scenario 300 for utilizing the secondary access device 128 to enhance vehicle 102 authentication. Similar to the scenario 200, in the scenario 300 the camera 138 of the vehicle 102 is used to image aspects of the secondary access device 128 to confirm access of the user. However, in the scenario 300, the camera 138 is used to capture the code 134 indicated on the secondary access device 128.

This code 134 may be captured and compared to the codes 134 indicated in the access list 140. If the code 134 indicates an authorized user, then, in combination with the primary access device 108 the user may be provided with access to the vehicle 102 corresponding to the permissions given to the user via the access list 140. Otherwise, the user may be unable to access the vehicle 102, despite the user having possession of the primary access device 108.

Figure 4:
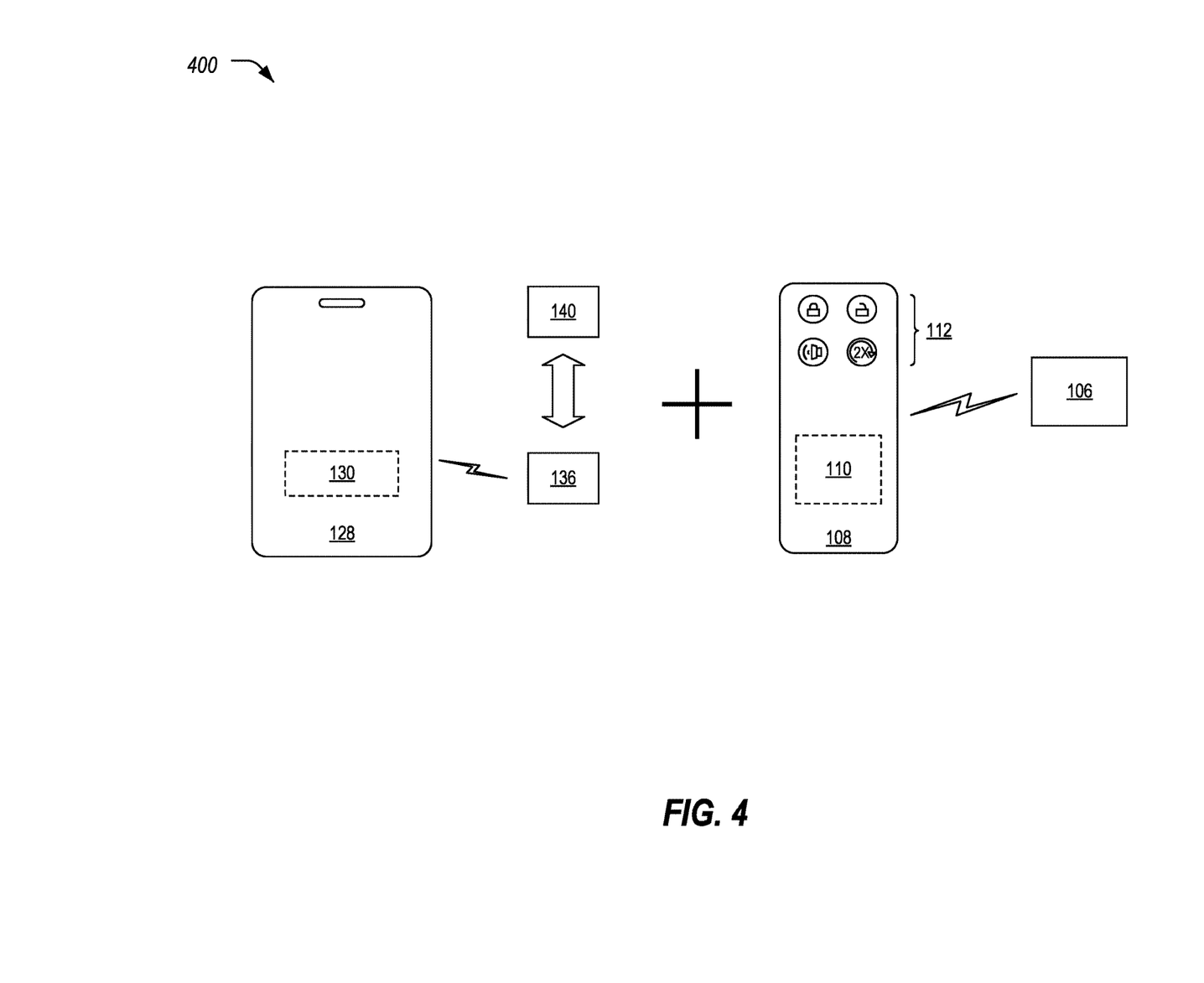
FIG. 4 illustrates yet another example scenario for utilizing the secondary access device to enhance vehicle authentication.

FIG. 4 illustrates yet another example scenario 400 for utilizing the secondary access device 128 to enhance vehicle 102 authentication. Similar to the scenario 300, in the scenario 400 aspects of the secondary access device 128 are used to confirm access of the user. However, in the scenario 400, the NFC transceiver 136 of the vehicle 102 is used to capture coded information stored to the NFC element 130 of the secondary access device 128. This captured information is compared to the information indicated in the access list 140. If the information indicates an authorized user, then, in combination with the primary access device 108 the user may be provided with access to the vehicle 102 corresponding to the permissions given to the user via the access list 140. Otherwise, the user may be unable to access the vehicle 102, despite the user having possession of the primary access device 108.

Figure 5:
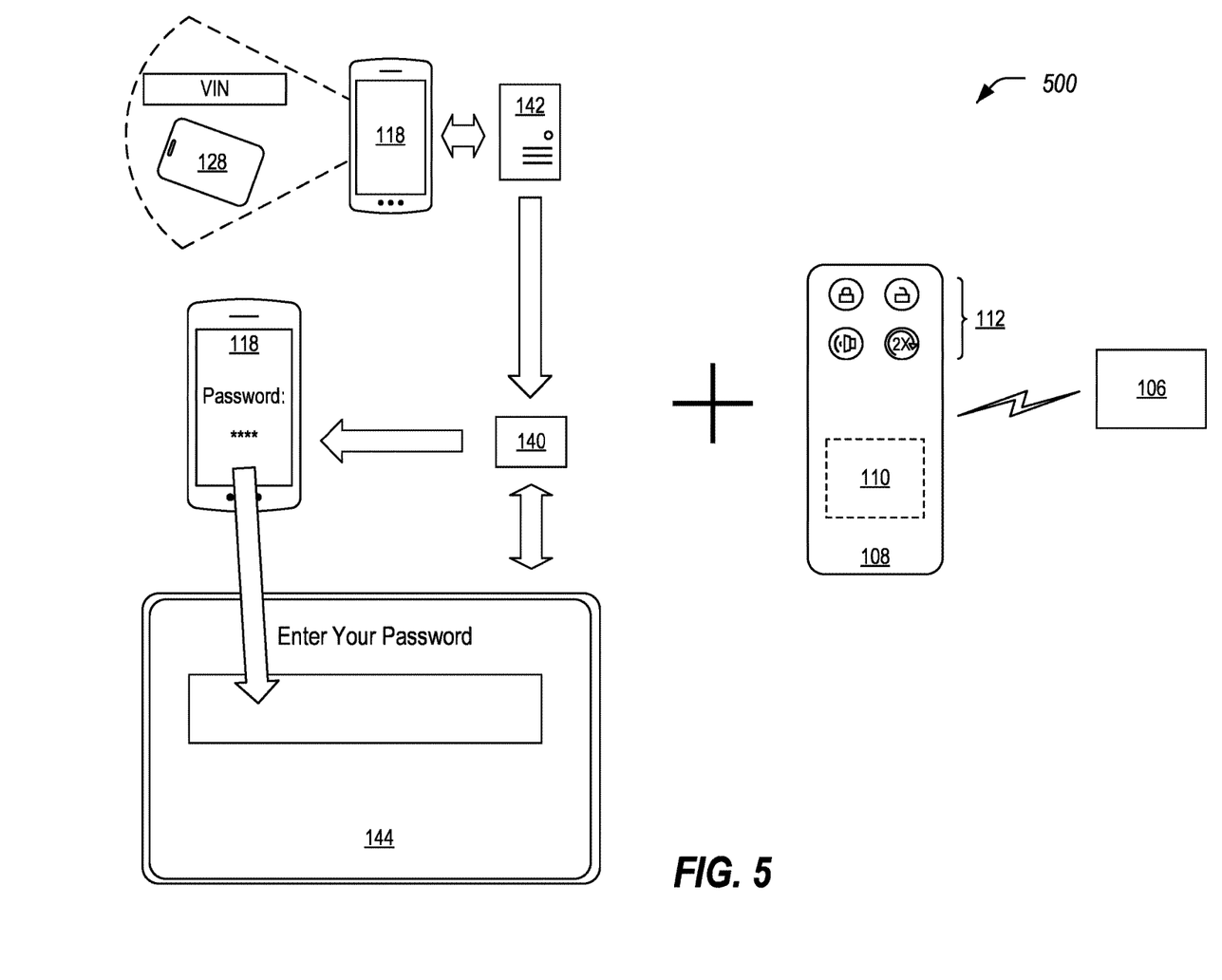
FIG. 5 illustrates yet a further example scenario for utilizing the secondary access device to enhance vehicle authentication.

FIG. 5 illustrates yet a further example scenario 500 for utilizing the secondary access device 128 to enhance vehicle 102 authentication. In this scenario 500, the mobile device 118 of the user may be used to scan information to use to generate a passcode or password. This information may include aspects of the secondary access device 128, such as the code 134, picture 132, and/or data from the NFC element 130. This information may also include the YIN or other identifier of the vehicle 102 to allow the passcode to be specific to the vehicle 102. This identifier of the vehicle 102 may be scanned from a door jam, under the front windshield, on paperwork associated with the vehicle 102, or manually entered by the user, as some possibilities.

This information may be sent by the mobile device 118 to the server 142, which may generate the passcode. For instance, the passcode may be generated randomly, or via a hash of the provided information. The passcode may be returned to the mobile device 118 and also be provided to the vehicle 102 with the access list 140. The user of the mobile device 118 may then enter the passcode into the HMI 144 of the vehicle 102 to confirm the secondary authentication of the user. As with the other scenarios 200-400, in the scenario 500 the permissions of the user may also be specified by the access list 140 and enforced by the vehicle 102.

Figure 6:
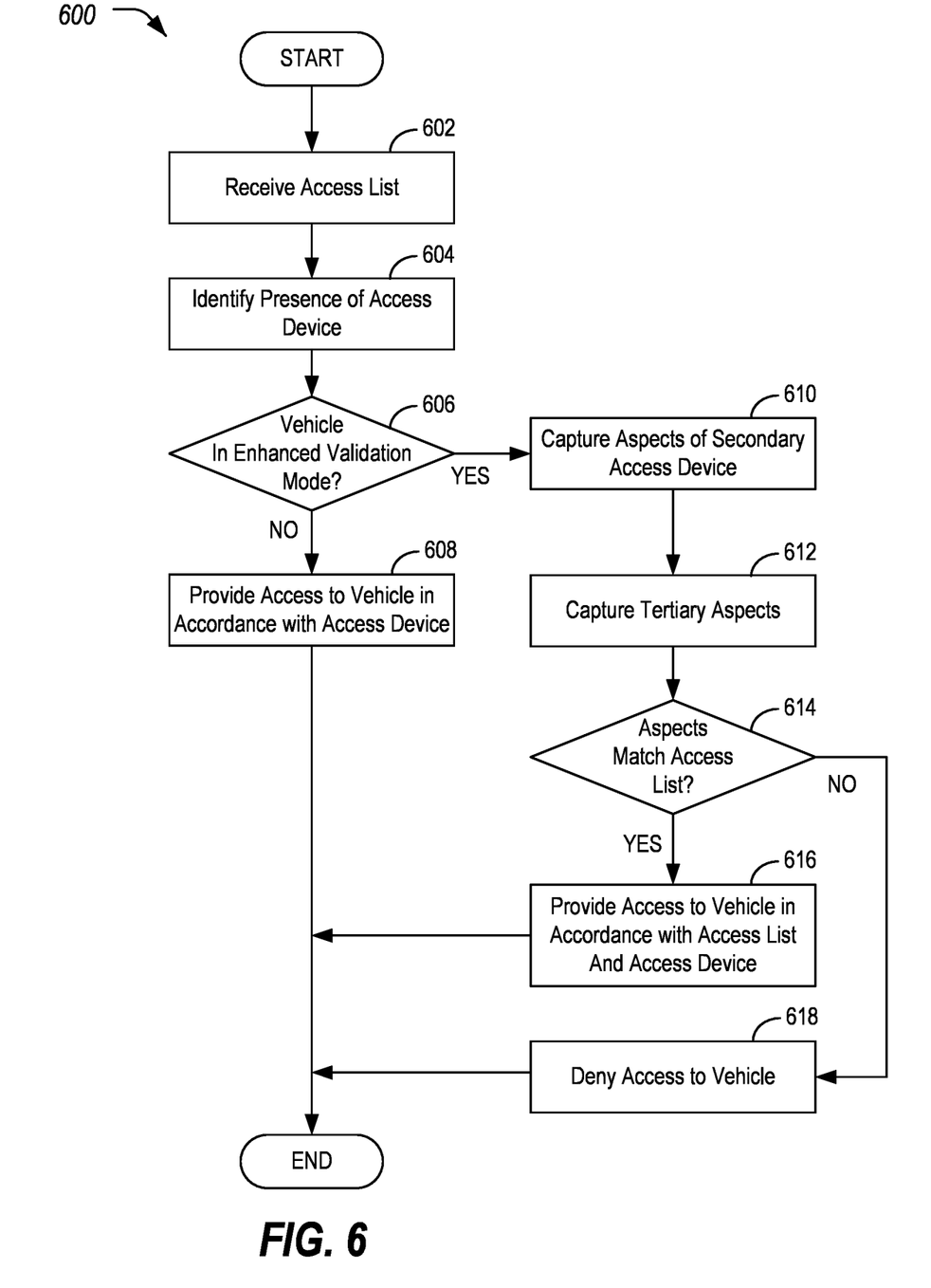
FIG. 6 illustrates an example process for operation of the administrative actions by the server.

FIG. 6 illustrates an example process 600 for the enhanced validation mode providing secondary authentication for vehicle 102 access. In an example, the process 600 may be performed by the vehicle 102 in the context of the system 100.

At operation 602, the vehicle 102 receives one or more access lists 140 from the server 142. For instance, the body controller 104 may utilize the TCU 116 to communicate with the server 142 over the wide-area network 122. The access lists 140 may include indications of codes 134, pictures 132, etc. that are allowed access to the vehicle 102. In addition to allowing or denying access, the access list 140 may further indicate details of the access, such as geo-fenced locations in which the vehicle 102 may be used or not used, navigation routes approved for operation of the vehicle 102 by the user, times of operation during which the vehicle 102 may be used or not used, durations of operation for which the vehicle 102 may be used, etc.

At operation 604, the vehicle 102 identifies presence of a primary access device 108. In an example, the body controller 104 of the vehicle 102 may identify the presence of the primary access device 108 by utilizing the RF transceiver 106. For instance, the access manager 124 of the body controller 104 may authenticate authentication requests to enter and/or start the vehicle 102. These may be received, in an example, from the fob transceiver 110 of a physical key or from a mobile device 118 executing an access application 120 to operate as a PaaK.

At operation 606, the vehicle 102 determines whether the vehicle 102 is in enhanced validation mode. In an example, the body controller 104 may maintain mode information indicative of whether the vehicle 102 is or is not in the enhanced validation mode. In an example, the enhanced validation mode may be set in the body controller 104 before the vehicle 102 is delivered to the customer and disabled once the vehicle 102 is delivered to the customer. In another example, the enhanced validation may be set when the vehicle 102 is in custody of a dealer or repair facility, to ensure that the vehicle 102 is being accessed by authorized dealer or repair personnel. In yet another example, the enhanced validation mode may be set when the vehicle 102 is in a valet mode, to ensure that the vehicle 102 is being accessed by authorized valet personnel. If the enhanced validation mode is not set, control passes to operation 608. If the enhanced validation mode is set, control passes to operation 610.

At operation 608, the vehicle 102 provides access to the vehicle 102 in accordance with the primary access device 108. In such a state, the secondary access device 128 are not used or required. That is, if the primary access device 108 is validated by the body controller 104 as being able to grant access, then access is granted. Otherwise, access is denied. After operation 608, the process 600 ends.

At operation 610, the vehicle 102 captures aspects of the secondary access device 128. In an example, as shown in the scenario 200, the user may present the secondary access device 128 to the camera 138 of the vehicle 102 to allow the camera 138 to read the picture 132 on the secondary access device 128. This picture 132 may be an image of the user corresponding to the secondary access device 128. In another example, as shown in the scenario 300, the user may present the secondary access device 128 to the camera 138 of the vehicle 102 to allow the camera 138 to capture the code 134 indicated on the secondary access device 128. This code 134 may be in various forms, such as numeric, alphanumeric, a bar code, a QR code, etc. In yet a further example, as shown in the scenario 400, the NFC transceiver 136 of the vehicle 102 may capture coded information stored to the NFC element 130 of the secondary access device 128. In still another example, as shown in the scenario 500, the HMI 144 of the vehicle 102 may receive a passcode generated by scanning the secondary access device 128.

At operation 612, the vehicle 102 optionally captures tertiary aspects independent of the primary access device 108 and secondary access device 128. For instance, as shown in the scenario 200, the camera 138 of the vehicle 102 may additionally be used to capture an image of the user. This image of the user may be compared to the picture 132 from the secondary access device 128. If the images are a match, then the user may be allowed to access the vehicle 102. In one example, facial recognition techniques may be used to compare the images. This approach may be used to limit authorization to only employees on record of currently having badged into the complex at which the vehicle 102 is stored, as well as to prevent badges from being shared between users. As some other examples, the tertiary aspects may include information such as the time of day, location of the vehicle 102, odometer reading, and/or other information that may be specified in the access list 140 as parameters of access of the vehicle 102.

At operation 614, the vehicle 102 determines whether the aspects captured at operations 610 and 612 match the information of the access lists 140. For instance, as shown in the scenario 200, if the picture 132 of the user matches that of an image included in the access list 140, then the vehicle 102 may allow the user access to the vehicle 102. Also, with respect to the scenario 200, as a further verification if the tertiary image captures of the user in possession of the secondary access device 128 also matches the picture 132, then the vehicle 102 may allow access. Or, as shown in the scenario 300, if the code 134 captured by the camera 138 matches a code included in the access list 140, then the vehicle 102 may allow the user access to the vehicle 102. Or, as shown in the scenario 400, if the NFC data captured by the NFC transceiver 136 matches allowable NFC information included in the access list 140, then the vehicle 102 may allow the user access to the vehicle 102. Or as shown in the scenario 500, if the passcode entered into the HMI 144 matches that included in the access lists 140, then the vehicle 102 may allow the user access to the vehicle 102. If these aspects are a match, control proceeds to operation 616. If any aspects are not a match, control passes to operation 618.

At operation 616, the vehicle 102 allows access to the vehicle 102 in accordance with the primary access device 108 and the access list 140. In such a state, both verification of the primary access device 108 and the secondary access device 128 is required. That is, if the primary access device 108 is validated by the body controller 104 as being able to grant access, then access is if the secondary access device 128 is also validated. Otherwise, access is denied. After operation 616, the process 600 ends.

At operation 618, the vehicle 102 denies access to the user. After operation 618, the process 600 ends.

Figure 7:
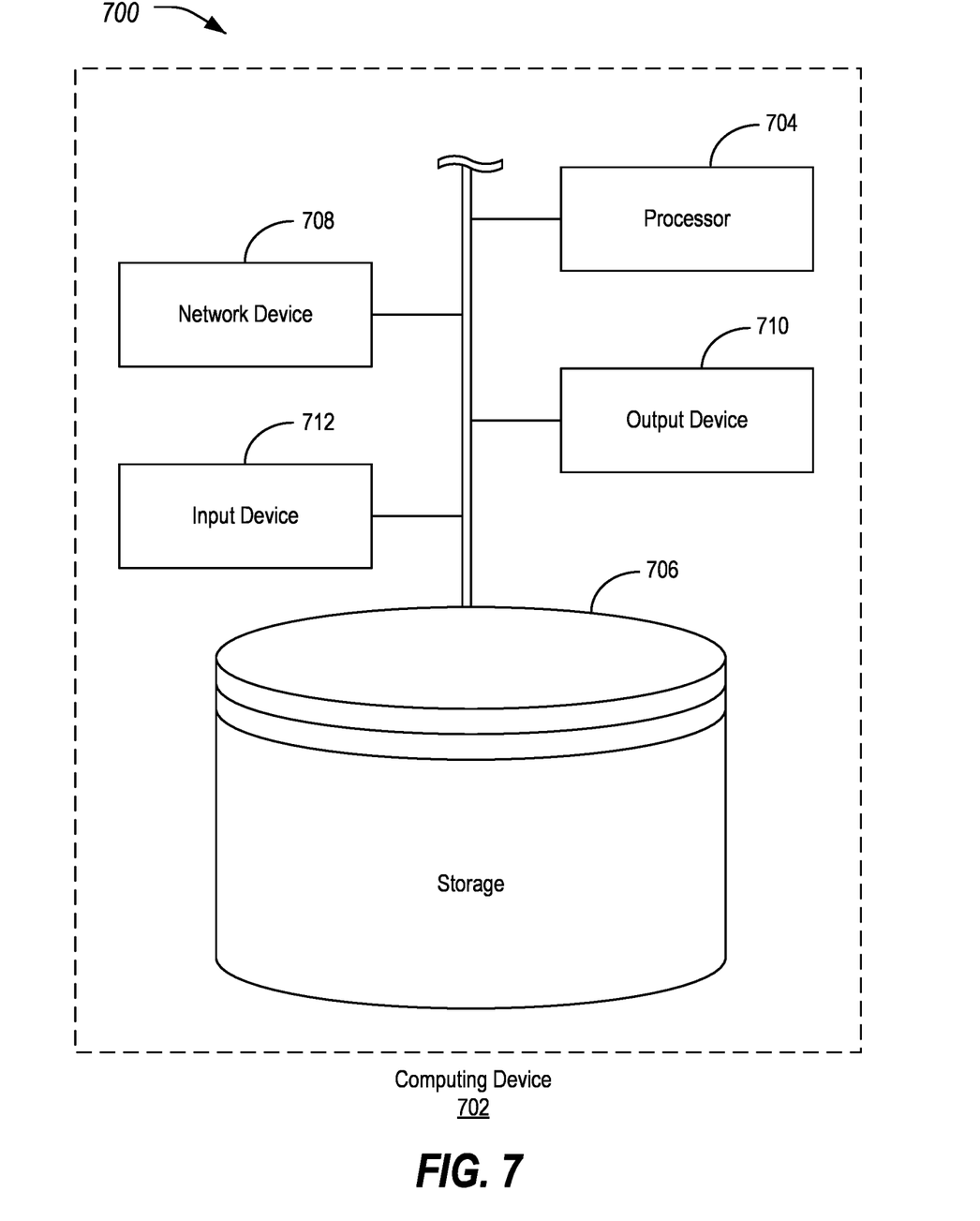
FIG. 7 illustrates an example of a computing device for use in the enhanced validation mode providing secondary authentication for vehicle access.

FIG. 7 illustrates an example 700 of a computing device 702 for use in the enhanced validation mode providing secondary authentication for vehicle 102 access. Referring to FIG. 7, and with reference to FIGS. 1-6, the vehicles 102, body controller 104, RF transceiver 106, primary access device 108, fob transceiver 110, lock/unlock mechanism 114, TCU 116, mobile devices 118, access manager 124, and the server 142 may be examples of such computing devices 702. As shown, the computing device 702 includes a processor 704 that is operatively connected to a storage 706, a network device 708, an output device 710, and an input device 712. It should be noted that this is merely an example, and computing devices 702 with more, fewer, or different components may be used.

The processor 704 may include one or more integrated circuits that implement the functionality of a central processing unit (CPU) and/or graphics processing unit (GPU). In some examples, the processors 704 are a system on a chip (SoC) that integrates the functionality of the CPU and GPU. The SoC may optionally include other components such as, for example, the storage 706 and the network device 708 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 704 executes stored program instructions that are retrieved from the storage 706, such as those of the access application 120 or access manager 124. The stored program instructions, accordingly, include software that controls the operation of the processors 704 to perform the operations described herein. The storage 706 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 710. The output device 710 may include a graphical or visual display device, such as an electronic display screen, projector, printer, or any other suitable device that reproduces a graphical display. As another example, the output device 710 may include an audio device, such as a loudspeaker or headphone. As yet a further example, the output device 710 may include a tactile device, such as a mechanically raiseable device that may, in an example, be configured to display braille or another physical output that may be touched to provide information to a user.

The input device 712 may include any of various devices that enable the computing device 702 to receive control input from users. Examples of suitable input devices that receive human interface inputs may include keyboards, mice, trackballs, touchscreens, voice input devices, graphics tablets, and the like.

The network devices 708 may each include any of various devices that enable the vehicles 102 and server 142 to send and/or receive data from external devices over networks. Examples of suitable network devices 708 include an Ethernet interface, a Wi-Fi transceiver, a cellular transceiver, or a BLUETOOTH or BLE transceiver, a UWB transceiver or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle implementing an enhanced validation mode, comprising:
    a controller having a hardware processor, programmed to:
        maintain, in a storage, mode information indicative of whether the vehicle is or is not in the enhanced validation mode;
        receive a passcode in an access list descriptive of which secondary access devices are allowable for use in confirming a user is authorized, the passcode also being received to a mobile device from a server, the server generating the passcode based on a vehicle identification number (VIN) of the vehicle and aspects of a secondary access device received to the server from the mobile device, the secondary access device being a physical credential issued to the user to grant the user access to a physical location;
        identify presence of a primary access device;
        responsive to the vehicle being in the enhanced validation mode according to the maintained mode information, validate the aspects of the secondary access device using the access list, in addition to utilizing the primary access device to validate access to the vehicle, wherein to validate access to the vehicle includes to confirm that a passcode entered into a human machine interface (HMI) is valid based on the access list; and
        responsive to the vehicle not being in the enhanced validation mode according to the maintained mode information, utilize the primary access device but not the secondary access device to validate access to the vehicle.

2. The vehicle of claim 1, wherein the secondary access device is an employee badge granting the user access to the physical location of an employer.

3. The vehicle of claim 2, wherein the controller is further programmed to capture, using a camera of the vehicle, an image of a picture located on the secondary access device, wherein to validate access to the vehicle includes to confirm that the image is of a person authorized by the access list.

4. The vehicle of claim 3, wherein the controller is further programmed to capture, using the camera of the vehicle, an image of the user, wherein to validate access to the vehicle includes to confirm that the image of the user is of the same person as the image of the picture located on the secondary access device.

5. The vehicle of claim 2, wherein the controller is further programmed to capture, using a camera of the vehicle, an image of a code located on the secondary access device, wherein to validate access to the vehicle includes to confirm that the code is a valid code based on the access list.

6. The vehicle of claim 2, wherein the controller is further programmed to capture, using a near field communication (NFC) transceiver of the vehicle, an information stored to an NFC element of the secondary access device, wherein to validate access to the vehicle includes to confirm that the information is valid based on the access list.

7. The vehicle of claim 1, wherein to validate access to the vehicle includes to unlock doors of the vehicle or allow the vehicle to be transitioned into a motive mode.

8. The vehicle of claim 1, wherein the controller is further programmed to:
   initially set the mode information in the storage of the vehicle to the enhanced validation mode responsive to the vehicle not having been delivered to a customer; and
   transition the mode information in the storage of the vehicle to no longer be set to the enhanced validation mode responsive to the vehicle being delivered to the customer.

9. The vehicle of claim 1, wherein the controller is further programmed to:
   transition the mode information in the storage of the vehicle to the enhanced validation mode responsive to the vehicle being delivered by a customer to a dealer or repair facility for servicing; and
   transition the mode information in the storage of the vehicle out of the enhanced validation mode responsive to the vehicle being returned to the customer.

10. The vehicle of claim 1, wherein the controller is further programmed to:
    transition the mode information in the storage of the vehicle to the enhanced validation mode responsive to the vehicle being set to valet mode; and
    transition the mode information in the storage of the vehicle out of the enhanced validation mode responsive to the vehicle being removed from the valet mode.

11. The vehicle of claim 1, wherein the primary access device is a key fob or a mobile device operating as a Phone-as-a-Key (PaaK).

12. The vehicle of claim 1, wherein the access list identifies, for each authorized user, details of allowable access to the vehicle, including one or more of geo-fenced locations in which the vehicle can be used or not used, navigation routes approved for operation of the vehicle, times of operation during which the vehicle can be used or not used, and/or durations of operation for which the vehicle can be used.

13. A method for implementing an enhanced validation mode, comprising:
    maintaining, in a storage, mode information indicative of whether the vehicle is or is not in the enhanced validation mode;
    receiving a passcode in an access list descriptive of which secondary access devices are allowable for use in confirming a user is authorized, the passcode also being received to a mobile device from a server, the server generating the passcode based on a vehicle identification number (VIN) of the vehicle and aspects of a secondary access device received to the server from the mobile device, the secondary access device being a physical credential issued to the user to grant the user access to a physical location;
    identifying, using a radio frequency (RF) transceiver of a vehicle, presence of a primary access device;
    responsive to the vehicle being in the enhanced validation mode according to the maintained mode information, validating the aspects of a secondary access device with the access list, in addition to utilizing the primary access device to validate access to the vehicle; and
    responsive to the vehicle not being in the enhanced validation mode according to the maintained mode information, utilizing the primary access device but not the secondary access device to validate access to the vehicle.

14. The method of claim 13, further comprising one or more of:
    capturing, using a camera of the vehicle, an image of a person located on the secondary access device, wherein to validate access to the vehicle includes to confirm that the image is of a person authorized by the access list; or
    capturing, using the camera of the vehicle, an image of the user, wherein to validate access to the vehicle includes to confirm that the image of the user is of the same person as the picture located on the secondary access device.

15. The method of claim 13, further comprising one or more of:
    capturing, using a camera of the vehicle, an image of a code located on the secondary access device, wherein to validate access to the vehicle includes to confirm that the code is a valid code based on the access list; or
    capturing, using a near field communication (NFC) transceiver of the vehicle, an information stored to an NFC element of the secondary access device, wherein to validate access to the vehicle includes to confirm that the information is valid based on the access list.

16. The method of claim 14, further comprising one or more of:
    initially setting the mode information in the storage of the vehicle to the enhanced validation mode responsive to the vehicle not having been delivered to a customer, and transitioning the mode information in the storage of the vehicle out of the enhanced validation mode responsive to the vehicle being delivered to the customer;
    transitioning the mode information in the storage of the vehicle to the enhanced validation mode responsive to the vehicle being delivered by the customer to a dealer or repair facility for servicing, and transitioning the mode information in the storage of the vehicle out of the enhanced validation mode responsive to the vehicle being returned to the customer; or
    transitioning the mode information in the storage of the vehicle to the enhanced validation mode responsive to the vehicle being set to valet mode, and transitioning the mode information in the storage of the vehicle out of the enhanced validation mode responsive to the vehicle being removed from the valet mode.

17. The method of claim 13, wherein the access list identifies, for each authorized user, details of allowable access to the vehicle, including one or more of geo-fenced locations in which the vehicle can be used or not used, navigation routes approved for operation of the vehicle, times of operation during which the vehicle can be used or not used, and/or durations of operation for which the vehicle can be used.

18. A non-transitory computer readable medium comprising instructions for implementing an enhanced validation mode that, when executed by a hardware processor of a controller of a vehicle, cause the vehicle to perform operations including to:
- maintain, in a storage, mode information indicative of whether the vehicle is or is not in the enhanced validation mode;
- receive a passcode in an access list descriptive of which secondary access devices are allowable for use in confirming a user is authorized, the passcode also being received to a mobile device from a server, the server generating the passcode based on a vehicle identification number (VIN) of the vehicle and aspects of a secondary access device received to the server from the mobile device, the secondary access device being a physical credential issued to the user to grant the user access to a physical location;
- identify, using a radio frequency (RF) transceiver of the vehicle, presence of a primary access device;
- responsive to the vehicle being in the enhanced validation mode according to the maintained mode information, validate the aspects of a secondary access device with the access list, in addition to utilizing the primary access device to validate access to the vehicle; and
- responsive to the vehicle not being in the enhanced validation mode according to the maintained mode information, utilize the primary access device but not the secondary access device to validate access to the vehicle.

* * * * *